(12) United States Patent
Fukuchi

(10) Patent No.: US 12,283,404 B2
(45) Date of Patent: Apr. 22, 2025

(54) WIRING COMPONENT WITH PHYSICAL QUANTITY SENSOR

(71) Applicant: Hitachi Metals, Ltd., Tokyo (JP)

(72) Inventor: Keisuke Fukuchi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 476 days.

(21) Appl. No.: 17/706,169

(22) Filed: Mar. 28, 2022

(65) Prior Publication Data

US 2022/0319738 A1    Oct. 6, 2022

(30) Foreign Application Priority Data

Apr. 6, 2021 (JP) ................... 2021-064588

(51) Int. Cl.
| | | |
|---|---|---|
| *H01B 7/32* | (2006.01) | |
| *G01K 1/14* | (2021.01) | |
| *H01B 7/40* | (2006.01) | |
| *H02K 11/25* | (2016.01) | |

(52) U.S. Cl.
CPC ............... *H01B 7/324* (2013.01); *G01K 1/14* (2013.01); *H01B 7/40* (2013.01); *H02K 11/25* (2016.01)

(58) Field of Classification Search
CPC . H01B 7/324; H01B 7/40; G01K 1/14; G01K 1/08; G01K 13/00; H02K 11/25
See application file for complete search history.

(56) References Cited

U.S. PATENT DOCUMENTS

| | | | | |
|---|---|---|---|---|
| 2018/0350486 A1* | 12/2018 | Egami | ............ | H01B 13/01209 |
| 2019/0265108 A1* | 8/2019 | Yoshihara | ................ | G01K 1/14 |
| 2019/0267871 A1* | 8/2019 | Yoshihara | ................ | H02K 5/08 |
| 2020/0393306 A1* | 12/2020 | Yoshihara | ................ | G01K 1/14 |
| 2022/0302799 A1* | 9/2022 | Silvery | ............... | H01R 25/162 |

FOREIGN PATENT DOCUMENTS

| | | |
|---|---|---|
| JP | 2008-147180 A | 6/2008 |
| JP | 2017-026521 A | 2/2017 |
| JP | 2020-180790 A | 11/2020 |

OTHER PUBLICATIONS

An Office Action; "Notice of Reasons for Refusal," mailed by the Japanese Patent Office on Jul. 2, 2024, which corresponds to Japanese Patent Application No. 2021-064588 and is related to U.S. Appl. No. 17/706,169; with English language translation.

* cited by examiner

*Primary Examiner* — Steven T Sawyer
(74) *Attorney, Agent, or Firm* — Studebaker Brackett PLLC

(57) ABSTRACT

A wiring component with physical quantity sensor is provided with a plurality of electric wires, a physical quantity sensor for detecting a physical quantity of the plurality of electric wires, an electric wire holding member including an intervening portion interposed between the plurality of electric wires, and a holder holding the physical quantity sensor. The electric wire holding member includes a protrusion protruding from the intervening portion in a direction perpendicular to an arrangement direction of the plurality of electric wires, and aligning the holder in longitudinal directions of the plurality of electric wires by the protrusion. The holder includes an electric wire engaging portion being engaged with at least one of the plurality of electric wires.

9 Claims, 8 Drawing Sheets

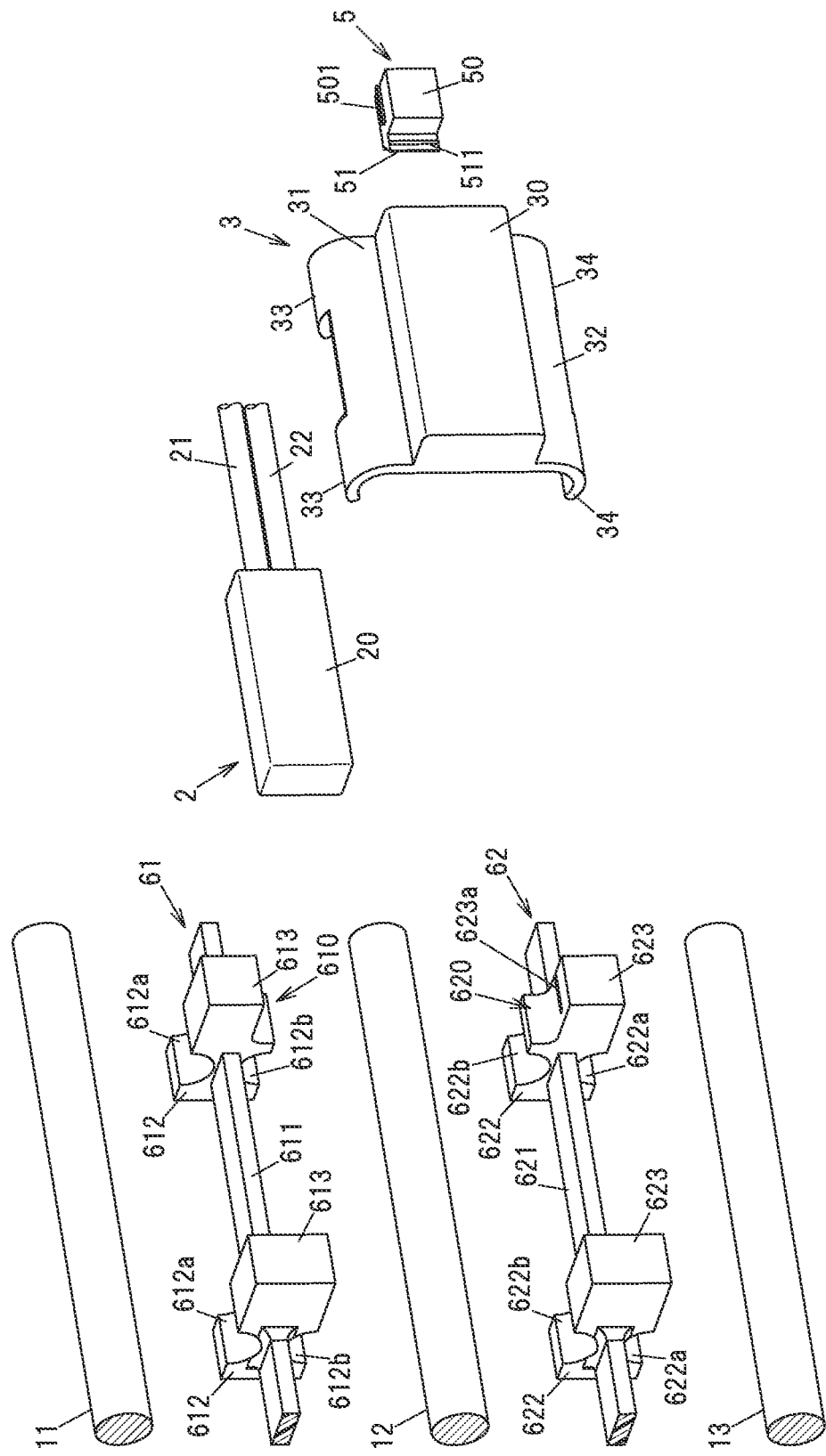

WIRING COMPONENT WITH PHYSICAL QUANTITY SENSOR

CROSS-REFERENCE TO RELATED APPLICATIONS

The present application is based on Japanese patent application No. 2021-064588 filed on Apr. 6, 2021, the entire contents of which are incorporated herein by reference.

TECHNICAL FIELD

The present invention relates to a wiring component with physical quantity sensor, i.e., a physical quantity sensor-including wiring component.

BACKGROUND ART

Conventionally, for example, the technique of detecting the temperature of an electric wire configured to supply exciting current to a stator winding of a motor by a temperature sensor, thereby suppressing damage caused by overheating the stator winding has been known. The electric wire to be detected (i.e., detecting target electric wire) heats up by Joule heat (copper loss) generated by flowing current in the electric wire, and the temperature of the detecting target electric wire also increases due to heat transfer from the motor. The applicant proposed a sensor adaptor by which the temperature sensor can be easily attached to the detecting target electric wire, and a motor wiring component using this sensor adaptor (see e.g., Patent Literature 1).

The sensor adaptor described in Patent Literature 1 includes a sensor holding part provided with a sensor space (i.e., a gap) configured to house a temperature sensor, and a measuring target holding part provided with a measuring target space (i.e., a gap) configured to house a measuring target electric wire in communication with the sensor space. A plurality of holding claws configured to surround and hold the measuring target electric wire is formed in the measuring target holding part.

CITATION LIST

Patent Literature

Patent Literature 1: JP 2020-180790A

SUMMARY OF THE INVENTION

According to the sensor adaptor described in Patent Literature 1, it is possible to easily attach the temperature sensor to the electric wire through a simple one touch operation without using an adhesive and so on. However, when such a sensor adaptor is attached to, e.g., a vehicle, it is assumed that the sensor adaptor in some attachment position may shift in a longitudinal direction of the electric wire from an initial position due to vibration in driving. In the case where such a misalignment occurs, a detected value of the temperature detected by the temperature sensor may change even when heat amount generated by the motor or the electric wire is the same, due to e.g., the change in positional relationship between the sensor adaptor and the motor.

Therefore, it is an object of the present invention to provide a wiring component with physical quantity sensor that can suppress a misalignment of a physical quantity sensor in a longitudinal direction of an electric wire that is a physical quantity detecting target.

According to an embodiment of the invention, a wiring component with physical quantity sensor, comprising:
 a plurality of electric wires;
 a physical quantity sensor for detecting a physical quantity of the plurality of electric wires;
 an electric wire holding member comprising an intervening portion interposed between the plurality of electric wires; and
 a holder holding the physical quantity sensor,
 wherein the electric wire holding member comprises a protrusion protruding from the intervening portion in a direction perpendicular to an arrangement direction of the plurality of electric wires, and aligning the holder in longitudinal directions of the plurality of electric wires by the protrusion, and
 wherein the holder comprises an electric wire engaging portion being engaged with at least one of the plurality of electric wires.

According to the wiring component with physical quantity sensor of the present invention, it is possible to suppress a misalignment of a physical quantity sensor in a longitudinal direction of an electric wire that is a physical quantity detecting target.

BRIEF DESCRIPTION OF DRAWINGS

FIG. 3 is an exploded perspective view of the peripheral part of the holder and the resin mold member viewed from a direction shown in FIG. 2A.

BEST MODE FOR CARRYING OUT THE INVENTION

Embodiment

Figure 1:
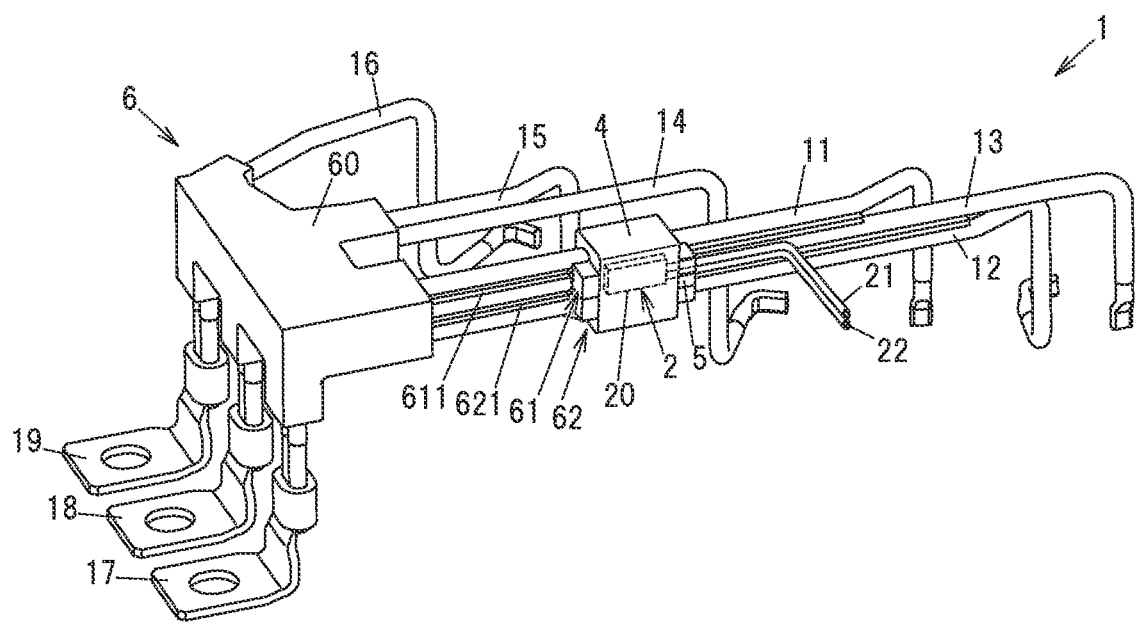
FIG. 1 is a whole view of a wiring component with physical quantity sensor according to the embodiment of the present invention.

FIG. 1 is a whole view of a wiring component with physical quantity sensor 1 according to the embodiment of the present invention. The wiring component with physical quantity sensor 1 is arranged between a terminal block and a three-phase alternate current motor used as e.g., a driving source for driving a vehicle. The wiring component with physical quantity sensor 1 is used to connect a stator winding of the three-phase alternate current motor and an electrode of the terminal block. In the present embodiment, the case where the temperature of the electric wire is detected as physical quantity will be explained. However, the present invention is not limited thereto. For example, the strength of a magnetic field generated by the electric current flowing through an electric wire may be detected as the physical quantity.

The wiring component with physical quantity sensor 1 comprises six electric wires 11 to 16, first to third terminals 17 to 19, and an electric wire holding member 6 that holds the six electric wires 11 to 16. The six electric wires 11 to 16 are enameled electric wires that are metal conductive wires covered with an enamel coating. The metal conductive wires are exposed at both ends in a longitudinal direction of the six electric wires 11 to 16 by removing the enamel coating. In the present embodiment, the electric wires 11 to 16 are single wires each having a circular cross-section. However, the electric wires 11 to 16 may be flat rectangular electric wires.

One ends (i.e., first ends) of two of the six electric wires 11 to 16 are respectively clamped at first to third terminals 17 to 19. The other ends (i.e., second ends) of the six electric wires 11 to 16 are connected to a stator winding of the three-phase alternate current motor by, e.g., welding.

The electric wire holding member 6 comprises a main body member 60 partially holding the electric wires 11 to 16 in respective longitudinal directions, a first spacer 61 comprising an intervening portion 611 interposed between the first electric wire 11 and the third electric wire 13, and a second spacer 62 comprising an intervening portion 621 interposed between the second electric wire 12 and the third electric wire 13. The intervening portion 611 of the first spacer 61 and the intervening portion 621 of the second spacer 62 are formed in a band shape extending the respective longitudinal directions of the first to third electric wires 11 to 13.

The electric wire holding member 6 is formed by arranging the first spacer 61 and the second spacer 62, which are preliminary injection molded, between the first electric wire 11 and the third electric wire 13, and between the second electric wire 12 and the third electric wire 13, and molding the main body member 60 in such a manner as to partially cover respective portions of the first spacer 61 and the second spacer 62, and to partially cover portions in the respective longitudinal directions of the electric wires 11 to 16.

Figure 2A:
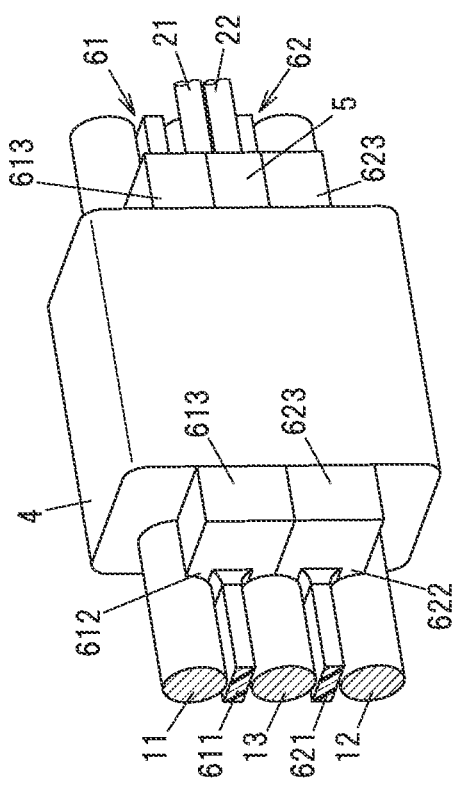
FIGS. 2A and 2B are perspective views of a peripheral part of a holder and a resin mold member around the holder.
Figure 2B:
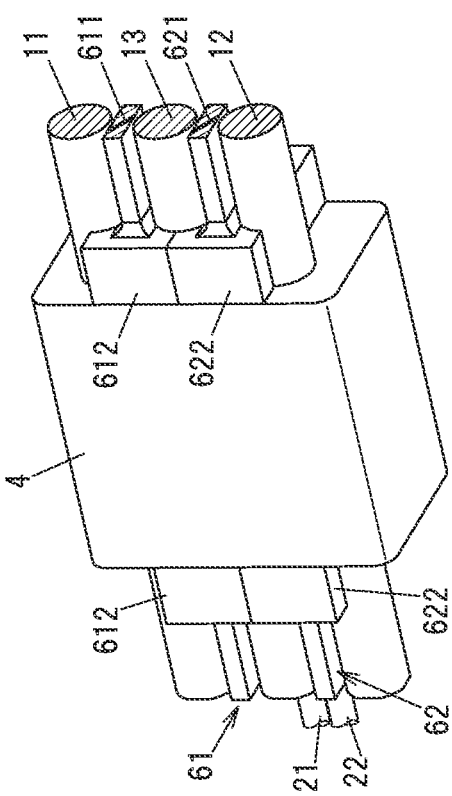
Figure 2C:
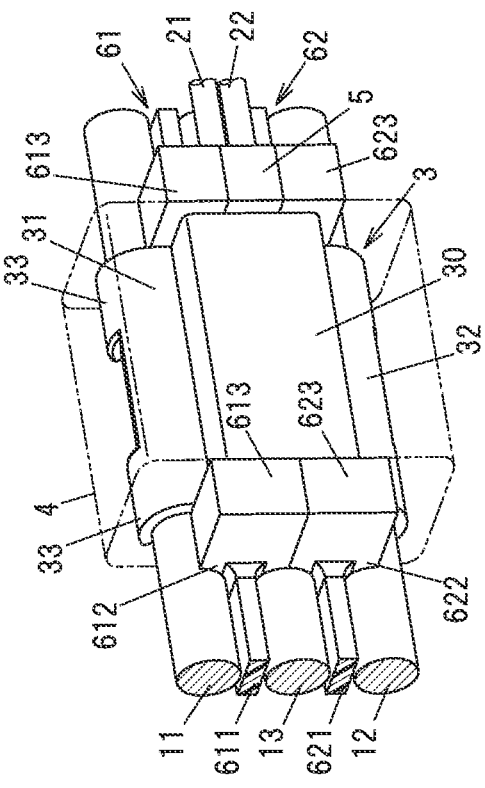
FIG. 2C is a perspective view showing the resin mold member by a virtual line in FIG. 2A.
Figure 2D:
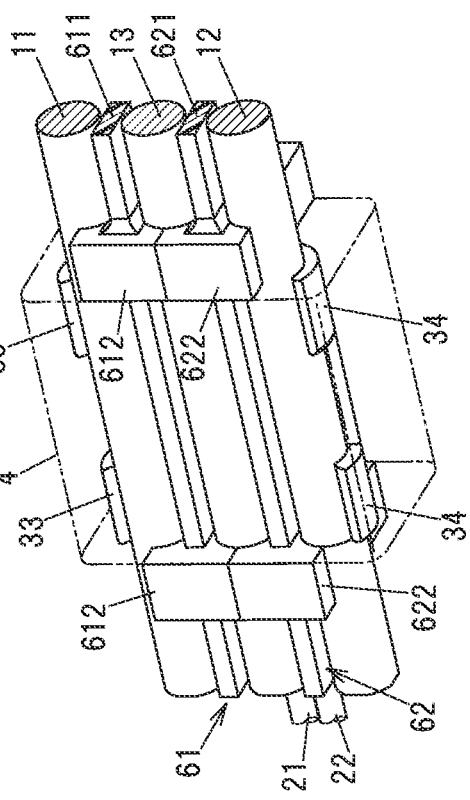
FIG. 2D is a perspective view showing the resin mold member by a virtual line in FIG. 2B.
Figure 4:
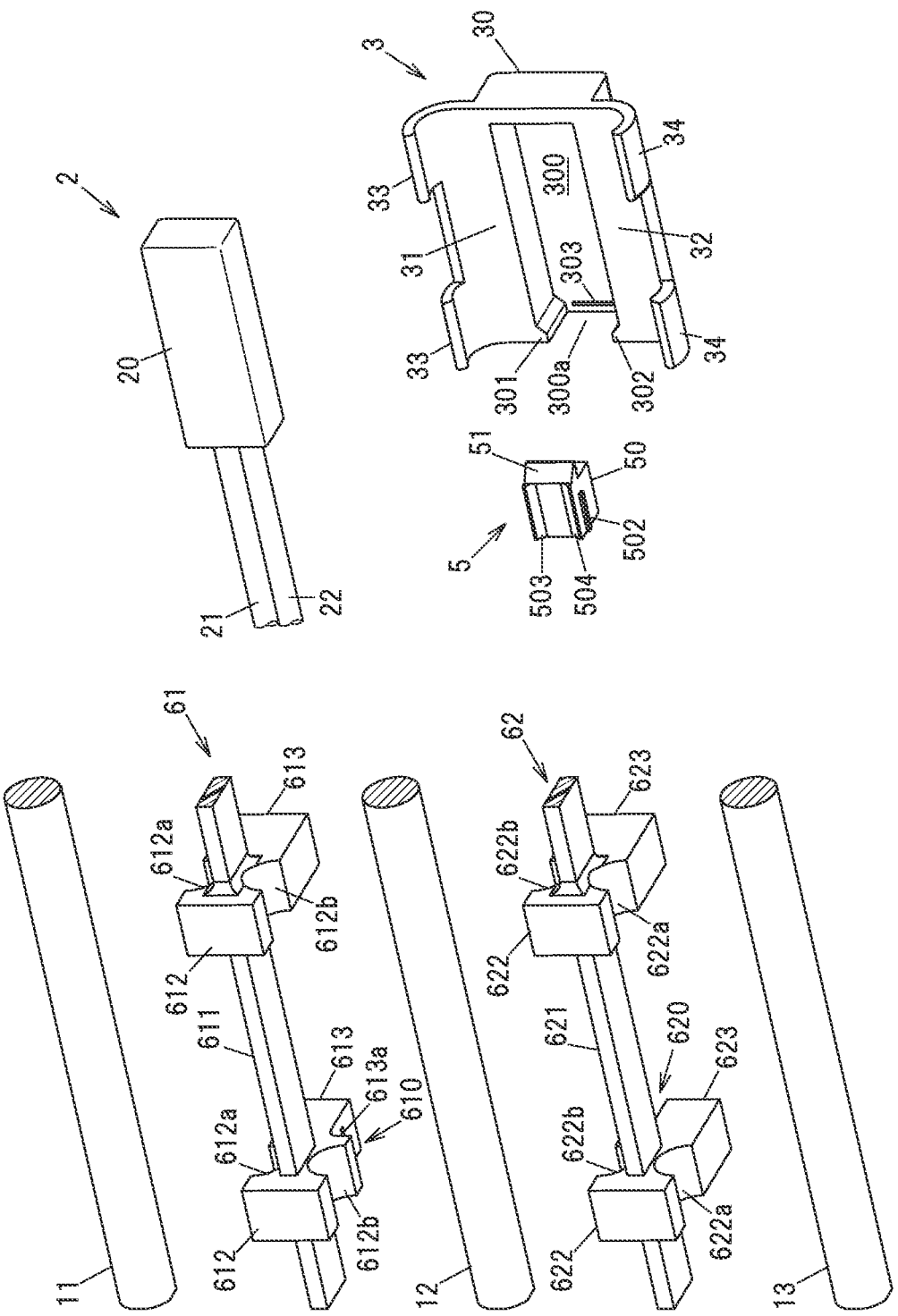
FIG. 4 is an exploded perspective view of the peripheral part of the holder and the resin mold member viewed from a direction shown in FIG. 2B.

FIGS. 2A and 2B are perspective views of an essential part of the wiring component with physical quantity sensor 1. FIG. 2C is a perspective view showing a resin mold member 4 by a virtual line (a dashed-and-double-dotted line) in FIG. 2A. FIG. 2D is a perspective view showing the resin mold member 4 by a virtual line in FIG. 2B. FIG. 3 is an exploded perspective view of the essential part of the wiring component with physical quantity sensor 1 viewed from a direction shown in FIG. 2A. FIG. 4 is an exploded perspective view of the essential part of the wiring component with physical quantity sensor 1 viewed from a direction shown in FIG. 2B.

The wiring component with physical quantity sensor 1 comprises a temperature sensor 2 serving as a physical quantity sensor, a holder 3 for holding the temperature sensor 2, the resin mold member 4 covering the outside of the holder 3, and a plug member 5 partially covered by the resin mold member 4. The temperature sensor 2 comprises a sensor main body 20 and two signal wires 21, 22 for transmitting detection signals of the temperature. In FIG. 1, the sensor main body 20 held by the holder 3 is shown by a dashed line.

The holder 3, the plug member 5, and the electric wire holding member 6 are composed of a resin. The holder 3 holds the temperature sensor 2 toward three electric wires 11 to 13 of the six electric wires 11 to 16. Hereinafter, these three electric wires 11 to 13 are referred to as the first to third electric wires 11 to 13. The first to third electric wires 11 to 13 are arranged in parallel with each other with having a predetermined interval and along one line (i.e., arranged side by side) at a peripheral part of the holder 3. In this arrangement direction, the third electric wire 13 is arranged between the first electric wire 11 and the second electric wire 12.

The first spacer 61 comprises a plurality of pedestal parts (i.e., base parts) 612 protruded from the intervening portion 611 toward the first electric wire 11 and the third electric wire 13, a plurality of protrusions 613 protruded from the intervening portion 611 along a direction perpendicular to the arrangement direction of the first to third electric wires 11 to 13 integrally with the intervening portion 611. A recess 612a that partially houses the first electric wire 11 and a recess 612b that partially houses the third electric wire 13 are formed at the pedestal part 612. In the present embodiment, two pedestal parts 612 are provided to be separated and distant from each other in the longitudinal directions of the first to third electric wires 11 to 13, and the two protrusions 613 are provided at positions respectively corresponding to the two pedestal parts 612.

Similarly, the second spacer 62 comprises a plurality of pedestal parts (i.e., base parts) 622 protruded from the intervening portion 621 toward the second electric wire 12 and the third electric wire 13, a plurality of protrusions 623 protruded from the intervening portion 621 along a direction perpendicular to the arrangement direction of the first to third electric wires 11 to 13 integrally with the intervening portion 621. A recess 622a that partially houses the second electric wire 12 and a recess 622b that partially houses the third electric wire 13 are formed at the pedestal part 622. In the present embodiment, two pedestal parts 622 are provided to be separated and distant from each other in the longitudinal directions of the first to third electric wires 11 to 13, and the two protrusions 623 are provided at positions respectively corresponding to the two pedestal parts 622.

The two protrusions 613 of the first spacer 61 and the two protrusions 623 of the second spacer 62 are respectively arranged at positions that are arranged side by side along the arrangement direction of the first to third electric wires 11 to 13. The first spacer 61 and the second spacer 62 are configured to position the holder 3 at a predetermined position in the first to third longitudinal directions by the two protrusions 613, 623. In other words, the electric wire holding member 6 comprises the protrusions 613, 623 at a plurality of positions that sandwiches the holder 3 in the longitudinal directions of the first to third electric wires 11 to 13.

A first notch 610 is formed at an end closer to the second spacer 62 of one protrusion 613 of the two protrusions 613 of the first spacer 61. In addition, a second notch 620 is formed at an end closer to the first spacer 61 of one protrusion 623 of the two protrusions 623 of the second spacer 62. Thus, a notch 600 (see FIGS. 8A to 8C and 9A to 9C to be explained below) is formed by the first notch 610 and the second notch 620, and the notch 600 allows the insertion of the signal wires 21, 22 of the temperature sensor 2. The plug member 5 closes at least a part of the notch 600.

The holder 3 integrally comprises a sensor holding part 30 including a housing recess 300 configured to house the sensor main body 20 of the temperature sensor 2, plate-like first and second extending portions 31, 32 extending from both ends, in the arrangement direction of the first to third electric wires 11 to 13, of the sensor holding part 30 along the arrangement direction, and the first electric wire engaging portion 33 and the second electric wire engaging portion 34 configured to engage with the first electric wire 11 and the second electric wire 12 respectively.

The housing recess 300 is formed at a portion that faces the third electric wire 13, and comprises an opening 300a at one side in the longitudinal directions of the first to third electric wire 11 to 13. One pair of retaining protrusions 301, 302 to suppress the sensor main body 20 escaping from the housing recess 300 are provided in the sensor holding part 30. The two signal wires 21, 22 of the temperature sensor 2 are led out from the housing recess 300 through a space between one pair of the retaining protrusions 301, 302.

In the present embodiment, the holder 3 comprises two first electric wire engaging portions 33 and two second electric wire engaging portions 34. The first electric wire engaging portion 33 is provided to protrude from both ends of the first extending portion 31 in the longitudinal directions of the first to third electric wire 11 to 13. The second electric wire engaging portion 34 is provided to protrude from both ends in the longitudinal directions of the first to third electric wire 11 to 13 of the second extending portion 32. The first electric wire engaging portion 33 and the second electric wire engaging portion 34 sandwich the first electric wire 11 and the second electric wire 12 along the arrangement direction of the first to third electric wire 11 to 13.

Figure 5:
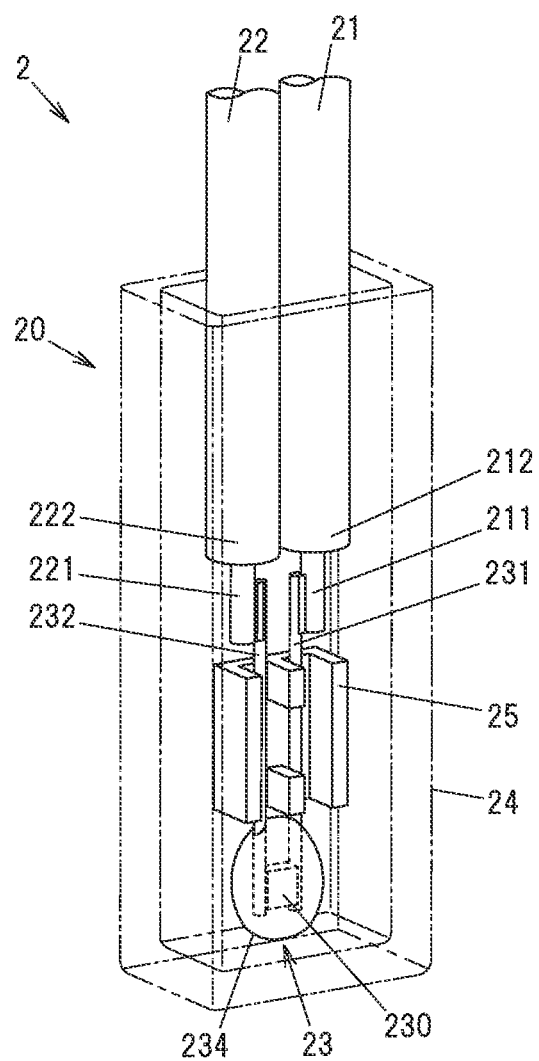
FIG. 5 is a structural diagram showing a configuration of a temperature sensor.

FIG. 5 is a structural diagram showing a configuration of the temperature sensor 2. The temperature sensor 2 comprises a thermistor 23 serving as a detecting part for converting the physical quantity (the temperature in the present embodiment) into electric signals, a case member 24 for housing the thermistor 23, a holding member 25 housed in the case member 24, and one pair of signal wires 21, 22 being led out from the case member 24. The case member 24 is a bottomed cylindrical mold composed of an injection molded resin. Inside the case member 24, a filler such as epoxy resin (not shown) is filled.

The thermistor 23 comprises a metal oxide sintered compact 230 serving as a detecting element in which the electric resistance changes depending on the temperature, and one pair of lead wires 231, 232 connected to the metal oxide sintered compact 230, and a sealing member 234 that seals the metal oxide sintered compact 230. For example, the sealing member 234 is composed of a glass sealant material, and formed in an oval spherical shape. The holding member 25 holds the one pair of the lead wires 231, 232 nearby the sealing member 234.

The signal wire 21, 22 are insulated electric wires including core wires 211, 221 being composed of e.g., twisted wires and covered with insulators 212, 222, respectively. One pair of the lead wires 231, 232 are respectively connected to the core wires 211, 221 of the signal wires 21, 22 by, e.g., welding. The signal wires 21, 22 transmit the temperature detection signals to, e.g., a motor controller. The motor controller controls the current to be fed to the motor and suppresses the damage caused by overheating when the temperature detected by the temperature sensor 2 is equal to or higher than a predetermined temperature.

Figure 6A:
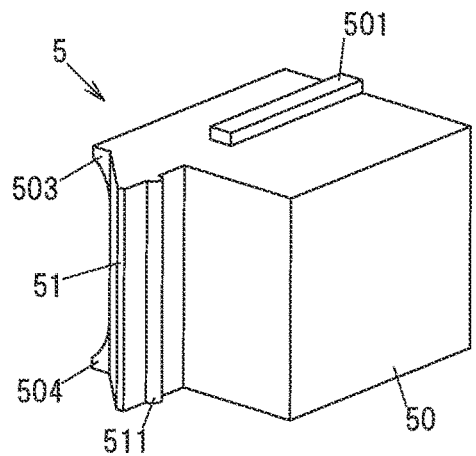
FIGS. 6A and 6B are perspective views of a plug member.
Figure 6B:
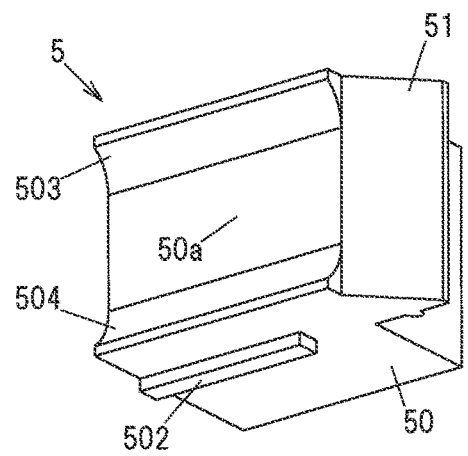
Figure 7A:
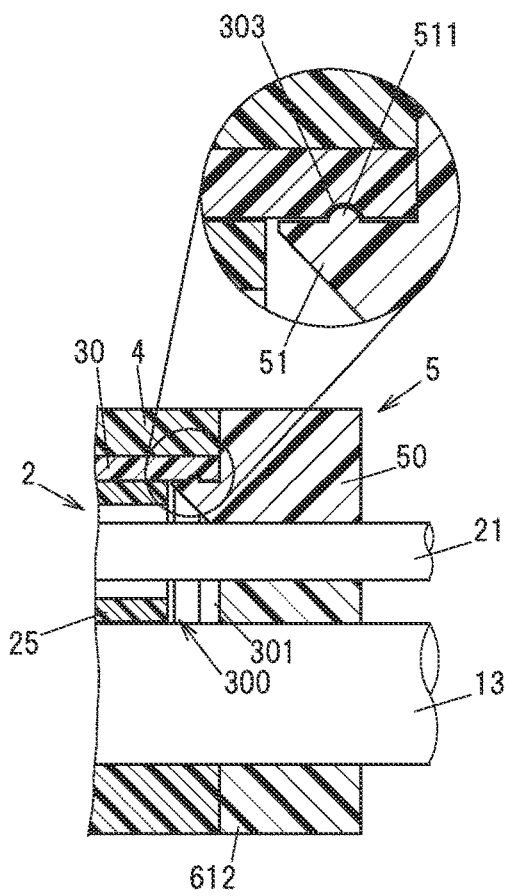
FIGS. 7A and 7B are cross-sectional views of the wiring component with physical quantity sensor in a peripheral part of the plug member.
Figure 7B:
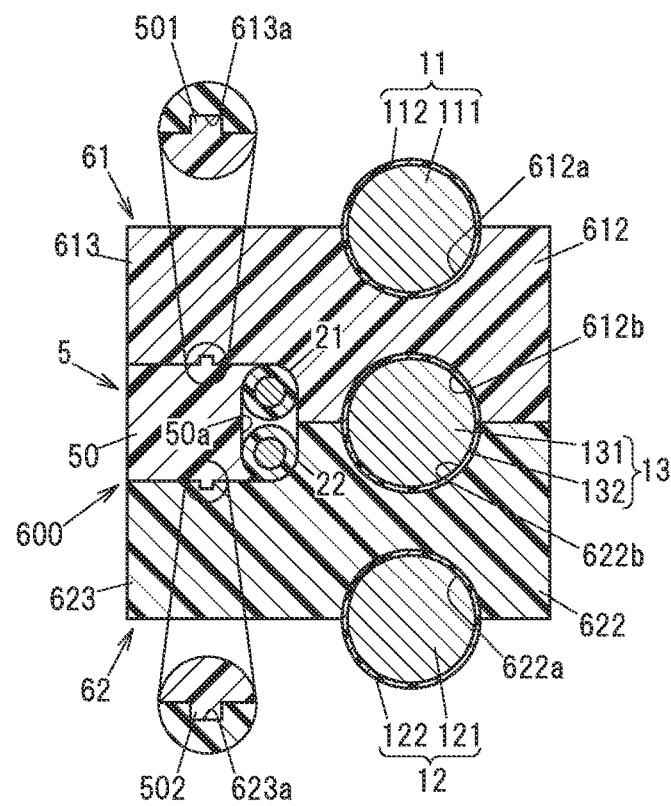

FIGS. 6A and 6B are perspective views of the plug member 5. FIGS. 7A and 7B are cross-sectional views of the wiring component with physical quantity sensor 1 in a peripheral part of the plug member 5.

The plug member 5 integrally comprises a substantially rectangular parallelepiped main body part 50 housed in the notch 600 and a projection 51 housed in the housing recess 300. The main body part 50 comprises a first engaging portion 501 configured to engage with one of the two protrusions 613 of the first spacer 61, in which the first notch 610 is formed, and a second engaging portion 502 configured to engage with one of the two protrusions 623 of the second spacer 62, in which the second notch 620 is formed.

An engaging groove 613a configured to be engaged with the first engaging portion 501 of the plug member 5 is formed at one of the protrusions 613 of the first spacer 61. An engaging groove 623a configured to be engaged with the second engaging portion 502 of the plug member 5 is formed at one of the protrusions 623 of the second spacer 62. The engaging grooves 613a, 623a are extending in the longitudinal directions of the first to third electric wires 11 to 13. The engaging grooves 613a, 623a serve as guiding grooves for guiding the plug member 5 when the main body part 50 of the plug member 5 is housed into the notch 600.

In addition, the main body part 50 of the plug member 5 comprises first and second protrusions 503, 504 at both ends of an opposing surface 50a facing the signal wires 21, 22 of the temperature sensor 2 in the arrangement direction of the first to third electric wires 11 to 13. The first and second protrusions 503, 504 are extending in the longitudinal directions of the first to third electric wires 11 to 13, and narrowing a space formed between the signal wires 21, 22 when the main body part 50 is housed into the notch 600.

The projection 51 of the plug member 5 comprises an engaging portion 511 configured to be engaged with the sensor holding part 30 of the holder 3. An engaging recess 303 configured to be engaged with the engaging portion 511 is formed at the sensor holding part 30. The plug member 5 is suppressed to escape from the notch 600 by the engaging portion 511 being engaged with the engaging recess 303.

The resin mold member 4 is formed between one of the protrusions 613, 623 of the first and second spacers 61, 62, and the other one of the protrusions 613, 623 of the first and second spacers 61, 62. The resin mold member 4 covers the holder 3 together with the first to third electric wires 11 to 13. The resin mold member 4 suppresses the removal of the holder 3 from the first to third electric wires 11 to 13, and suppresses the ingress of foreign matters such as water into the housing recess 300 of the holder 3.

The resin mold member 4 is formed by arranging the first and second spacers 61, 62 between the first to third electric wires 11 to 13, respectively engaging the first electric wire engaging portion 33 and the second electric wire engaging portion 34 of the holder 3 that houses the sensor main body 20 into the housing recess 300 with the first electric wire 11 and the second electric wire 12, arranging an assembly that houses the main body part 50 of the plug member 5 into the notch 600 in a die, and injecting a molten liquid resin into the die. In this molding, the plug member 5 blocks the entrance of the molten resin into the housing recess 300 through the notch 600.

Next, an assembling process of the assembly before forming the resin mold member 4 will be explained with referring to FIGS. 8A to 9C.

Figure 8A:
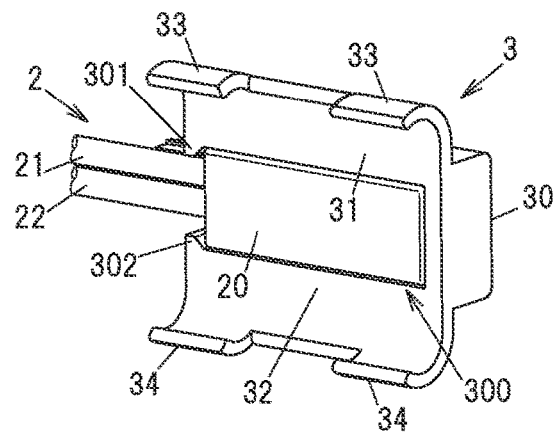
FIGS. 8A to 8C are explanatory diagrams showing the first to third assembling steps.

FIG. 8A shows the first assembling step for assembling the temperature sensor 2 to the holder 3. In this step, the sensor main body 20 is housed in the housing recess 300 of the holder 3, and the signal wires 21, 22 are led out from the opening 300a between the retaining protrusions 301, 302.

Figure 8B:
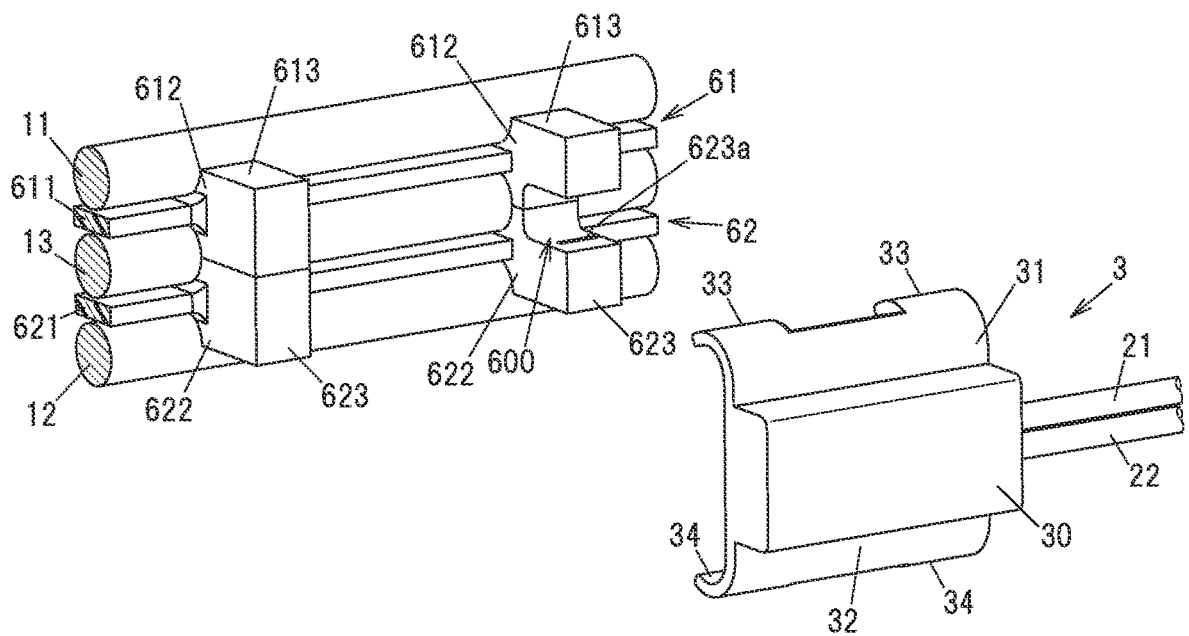

FIG. 8B shows the second assembling step for assembling the holder 3 holding the temperature sensor 2 to the first and second spacers 61, 62. In this process, the holder 3 is arranged between the two protrusions 613, 623 of the respective first and second spacers 61, 62. The sensor main body 20 of the temperature sensor 2 faces the third electric wire 13.

Figure 8C:
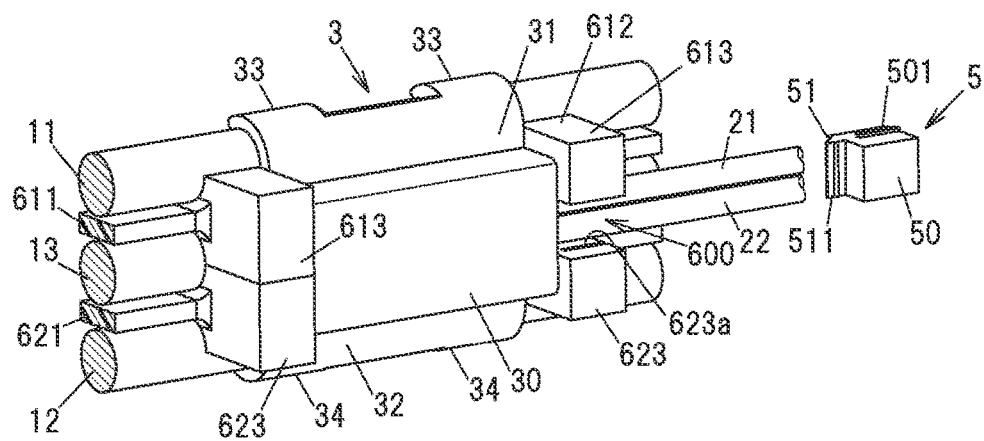

FIG. 8C shows the third assembling step for arranging the main body part 50 of the plug member 5 in the notch 600 between the first spacer 61 and the second spacer 62. The plug member 5 is secured to the first and second spacers 61, 62 and the holder 3 by respectively engaging the engaging grooves 613a, 623a formed at the protrusions 613, 623 of the first and second spacers 61, 62 with the first and second engaging portions 501, 502, and engaging the engaging recess 303 of the holder 3 with the engaging portion 511.

Figure 9C:
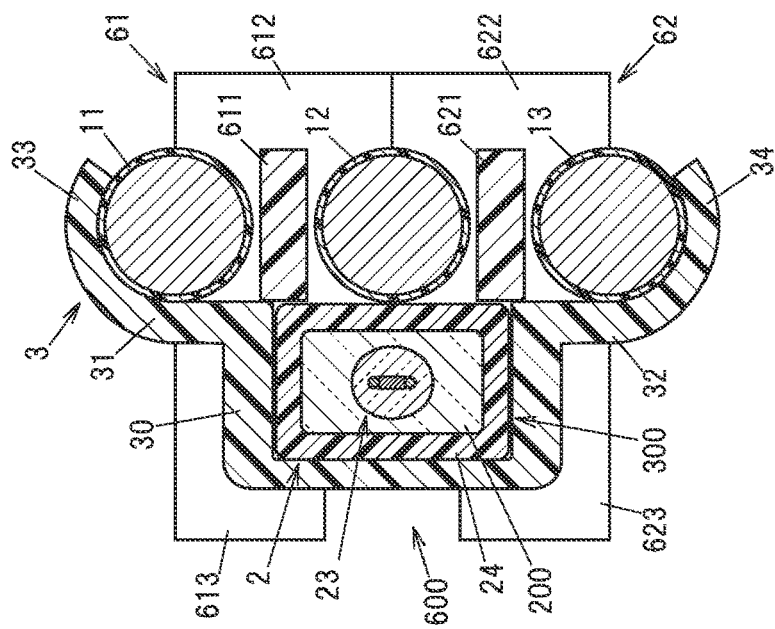
FIGS. 9A to 9C are cross-sectional views showing the status before and after performing the second assembling step in detail.
Figure 9B:
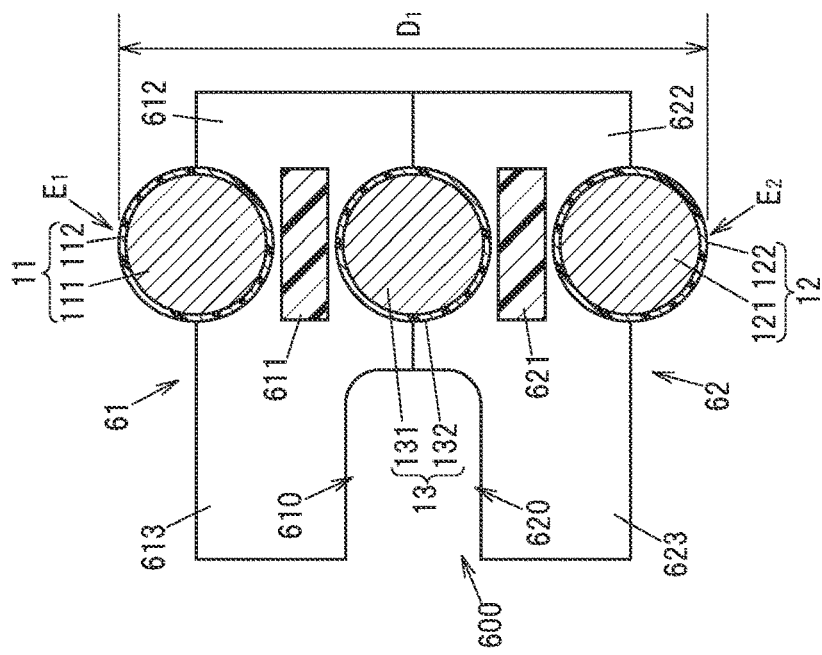
Figure 9A:
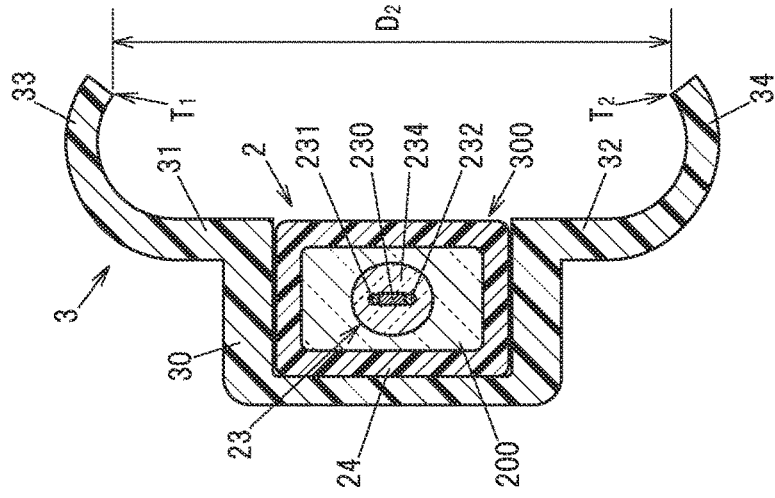

FIGS. 9A to 9C are cross-sectional views showing the status before and after performing the second assembling step in detail. FIG. 9A shows a cross-section of the temperature sensor 2 and the holder 3 before being assembled to the first and second spacers 61, 62. FIG. 9B shows a cross-section of the first to third electric wires 11 to 13 and the first and second spacers 61, 62 before being assembled to the temperature sensor 2 and the holder 3. FIG. 9C shows a cross-section of the temperature sensor 2, the holder 3, the first to third electric wires 11 to 13, and the first and second spacers 61, 62 after performing the second assembling step.

FIGS. 9B and 9C show the first to third electric wires 11 to 13 in cross-section perpendicular to the longitudinal direction. The first to third electric wires 11 to 13 are single wires (round wire) each having a circular cross section. The first to third electric wires 11 to 13 comprise conductive wires 111, 121, 131 being composed of high conductive metals such as copper and covered with insulating layers 112, 122, 132 composed of enamel resin, respectively. In addition, FIGS. 9A and 9C show a filler 200 filled inside the case member 24 of the temperature sensor 2.

As shown in FIGS. 9A and 9B, a distance $D_1$ between an opposite side end $E_1$ opposite to the second and third electric wires 12, 13 in the cross-section perpendicular to the longitudinal direction of the first electric wire 11, and an opposite side end $E_2$ opposite to the first and third electric wires 11, 13 in the cross-section perpendicular to the longitudinal direction of the second electric wire 12 is wider than a distance $D_2$ between a tip side end $T_1$ of the first electric wire engaging portion 33 and a tip side end $T_2$ of the second electric wire engaging portion 34 of the holder 3. In addition, the difference between the distances $D_1$ and $D_2$ is sized such that the tip side ends $T_1$ and $T_2$ of the first and second electric wire engaging portions 33, 34 can overcome the ends $E_1$, $E_2$ of the first and second electric wires 11, 12 by elastic deforming the first electric wire engaging portion 33 and the second electric wire engaging portion 34.

Hereby, it is possible to easily perform the second assembling step by relatively moving the holder 3 with respect to the first to third electric wires 11 to 13 and the first and second spacers 61, 62 along a direction perpendicular to the arrangement direction of the first to third electric wires 11 to 13.

Effects of the Embodiment

According to the wiring component with physical quantity sensor 1 as explained above, since the holder 3 is aligned (i.e., positioned) in the longitudinal directions of the first to third electric wires 11 to 13 by the protrusions 613, 623 of the first and second spacer 61, 62, it is possible to assemble the holder 3 at a precise position, and suppress the misalignment of the holder 3 caused by vibration or the like. Hereby, it is possible to achieve a precise temperature detection.

Further, in the above embodiment, although the wiring component with physical quantity sensor 1 comprising the resin mold member 4 is explained, the resin mold member 4 may not be necessarily provided. That is, the holder 3 may not be covered by the resin mold member 4 together with the first to third electric wires 11 to 13. In this case, the holder 3 is precisely aligned at a predetermined position in the longitudinal directions of the first to third electric wires 11 to 13 by the protrusions 613, 623 of the first and second spacer 61, 62. In the meantime, when the holder 3 is covered by the resin mold member 4 together with the first to third electric wires 11 to 13, the holder 3 is more securely fixed and it is possible to improve vibration resistance.

SUMMARY OF THE EMBODIMENT

Next, the technical concept grasped from the above-described embodiment is described with reference to the signs or the like in the embodiment. However, each sign or the like in the following description is not limited to a member or the like specifically showing the elements in the following claims in the embodiment.

[1] A wiring component with physical quantity sensor (1), comprising:
  a plurality of electric wires (11 to 13);
  a physical quantity sensor (2) for detecting a physical quantity of the plurality of electric wires (11 to 13);
  an electric wire holding member (6) comprising an intervening portion (611, 621) interposed between the plurality of electric wires (11 to 13); and
  a holder (3) holding the physical quantity sensor (2),
  wherein the electric wire holding member (6) comprises a protrusion (613, 623) protruding from the intervening portion (611, 621) in a direction perpendicular to an arrangement direction of the plurality of electric wires (11 to 13), and aligning the holder (3) in longitudinal directions of the plurality of electric wires (11 to 13) by the protrusion (613, 623), and
  wherein the holder (3) comprises an electric wire engaging portion (33, 34) being engaged with at least one of the plurality of electric wires (11 to 13).

[2] The wiring component with physical quantity sensor (1) according to [1], further comprising:
  a resin mold member (4) covering the holder (3) together with the plurality of electric wires (11 to 13).

[3] The wiring component with physical quantity sensor (1) according to [2], wherein the electric wire holding member (6) comprises the protrusions (613, 623) at a plurality of positions that sandwich the holder (3) in the longitudinal directions of the plurality of electric wires (11 to 13), and
  wherein the resin mold member (4) is provided between the plurality of protrusions (613, 623).

[4] The wiring component with physical quantity sensor (1) according to any one of [1] to [3], wherein the physical quantity sensor (2) comprises a signal wire (21, 22) configured to transmit a physical quantity detection signal and the signal wire (21, 22) is inserted into a notch (600) provided at the protrusion (613, 623), and
  wherein the wiring component with physical quantity sensor (1) further comprises a plug member (5) closing at least a part of the notch (6).

[5] The wiring component with physical quantity sensor (1) according to [4], wherein the plug member (5) comprises a plurality of engaging portions (501, 502, 511) being engaged with the protrusion (613, 623) and the holder (3).

[6] The wiring component with physical quantity sensor (1) according to any one of [1] to [5], wherein the holder (3) comprises a plurality of the electric wire engaging portions (33, 34) respectively being engaged with a first electric wire (11) and a second electric wire (12) of the plurality of electric wires (11 to 13).

[7] The wiring component with physical quantity sensor (1) according to [6], wherein the plurality of electric wire engaging portions (33, 34) sandwich the first electric wire (11) and the second electric wire (12) in the arrangement direction of the plurality of electric wires (11 to 13).

[8] The wiring component with physical quantity sensor (1) according to [7], wherein a distance ($D_1$) between an opposite side end ($E_1$) opposite to the second electric wire (12) in a cross-section perpendicular to a longitudinal direction of the first electric wire (11) and an opposite side end ($E_2$) opposite to the first electric wire (11) in a cross-section perpendicular to a longitudinal direction of the second electric wire (12) is wider than a distance between tip ends ($T_1$, $T_2$) of the plurality of electric wire engaging portions (33, 34) of the holder (3).

The invention claimed is:

1. A wiring component with physical quantity sensor, comprising:
    a plurality of electric wires;
    a physical quantity sensor for detecting a physical quantity of the plurality of electric wires;
    an electric wire holding member comprising an intervening portion interposed between the plurality of electric wires; and
    a holder holding the physical quantity sensor,
    wherein the electric wire holding member comprises a protrusion protruding from the intervening portion in a direction perpendicular to an arrangement direction of the plurality of electric wires, and aligning the holder in longitudinal directions of the plurality of electric wires by the protrusion, and
    wherein the holder comprises an electric wire engaging portion being engaged with at least one of the plurality of electric wires,
    wherein the physical quantity sensor comprises a signal wire configured to transmit a physical quantity detection signal and the signal wire is inserted into a notch provided at the protrusion,
    wherein the wiring component with the physical quantity sensor further comprises a plug member closing at least a part of the notch, and
    wherein all along its length, the plug member contacts the signal wire along a longitudinal axis of the notch.

2. The wiring component with physical quantity sensor according to claim 1, further comprising: a resin mold member covering the holder together with the plurality of electric wires.

3. The wiring component with physical quantity sensor according to claim 1,
    wherein the holder comprises a plurality of the electric wire engaging portions respectively being engaged with a first electric wire and a second electric wire of the plurality of electric wires.

4. The wiring component with physical quantity sensor according to claim 1, wherein the electric wire holding member, the holder, and the plug member are mechanically separate components.

5. The wiring component with physical quantity sensor according to claim 1, wherein all along its length, the plug member aligns the signal wire along a longitudinal axis of the notch.

6. The wiring component with physical quantity sensor according to claim 2,
    wherein the electric wire holding member comprises the protrusions at a plurality of positions that sandwich the holder in the longitudinal directions of the plurality of electric wires, and
    wherein the resin mold member is provided between the plurality of protrusions.

7. The wiring component with physical quantity sensor according to claim 3, wherein the plurality of electric wire engaging portions sandwich the first electric wire and the second electric wire in the arrangement direction of the plurality of electric wires.

8. The wiring component with physical quantity sensor according to claim 7,
    wherein a distance between an opposite side end opposite to the second electric wire in a cross-section perpendicular to a longitudinal direction of the first electric wire and an opposite side end opposite to the first electric wire in a cross-section perpendicular to a longitudinal direction of the second electric wire is wider than a distance between tip ends of the plurality of electric wire engaging portions of the holder.

9. A wiring component with physical quantity sensor, comprising: a plurality of electric wires; a physical quantity sensor for detecting a physical quantity of the plurality of electric wires; an electric wire holding member comprising an intervening portion interposed between the plurality of electric wires; and a holder holding the physical quantity sensor, wherein the electric wire holding member comprises a protrusion protruding from the intervening portion in a direction perpendicular to an arrangement direction of the plurality of electric wires, and aligning the holder in longitudinal directions of the plurality of electric wires by the protrusion, and wherein the holder comprises an electric wire engaging portion being engaged with at least one of the plurality of electric wires, and wherein the physical quantity sensor comprises a signal wire configured to transmit a physical quantity detection signal and the signal wire is inserted into a notch provided at the protrusion, and wherein the wiring component with physical quantity sensor further comprises a plug member closing at least a part of the notch, and wherein the plug member comprises a plurality of engaging portions being engaged with the protrusion and the holder.

* * * * *